United States Patent [19]

Chern et al.

[11] Patent Number: 4,586,780
[45] Date of Patent: * May 6, 1986

[54] DIRECTIONAL DIFFUSING SCREEN WITH SUPPRESSED ZERO-ORDER LIGHT

[75] Inventors: Mao-Jin Chern, Rancho Palos Verdes; John E. Gunther, Torrance; Ronald T. Smith, Redondo Beach, all of Calif.

[73] Assignee: Hughes Aircraft Company, Los Angeles, Calif.

[*] Notice: The portion of the term of this patent subsequent to May 6, 2003 has been disclaimed.

[21] Appl. No.: 403,944

[22] Filed: Jul. 30, 1982

[51] Int. Cl.[4] .................................. G02B 5/32
[52] U.S. Cl. ........................... 350/3.70; 350/96.27
[58] Field of Search ....................... 350/3.7, 96.27

[56] References Cited

U.S. PATENT DOCUMENTS

| | | | |
|---|---|---|---|
| 3,043,910 | 7/1962 | Hicks, Jr. | 350/96.27 |
| 3,580,655 | 5/1971 | Leith et al. | |
| 3,708,217 | 1/1973 | McMahon | 350/3.7 |
| 3,907,403 | 9/1975 | Maeda | |
| 4,118,106 | 10/1978 | Leith | 350/96.25 |
| 4,189,207 | 2/1980 | Fisher et al. | 350/276 R |
| 4,215,924 | 8/1980 | Matsumoto | |

FOREIGN PATENT DOCUMENTS

| | | |
|---|---|---|
| 1797475 | 9/1971 | Fed. Rep. of Germany. |
| 1574351 | 9/1980 | United Kingdom. |
| 1579214 | 11/1980 | United Kingdom. |

OTHER PUBLICATIONS

IBM Technical Disclosure Bulletin, vol. 23, No. 2, issued Jul. 1980 (New York)—G. T. Sincerboy et al., "System to Increase the Efficiency of the Holographs Energy Distribution for Individual Chip Replacement", pp. 831–832.

Primary Examiner—Bruce Y. Arnold
Attorney, Agent, or Firm—A. W. Karambelas

[57] ABSTRACT

Optical assembly (34) has a transmission holographic optical element (46) which refracts the incoming ray (38) at an angle through the angularly oriented fiber (56) in fiber optic faceplate (48). Holographic optical element (50) refracts the ray (66) to become ray (44) toward a viewing pupil. The zero-order light from holographic optical element (46) is absorbed as ray (68) in the fiber optic faceplate. The zero-order light represented by ray (76) is absorbed in the holographic optical element (50). Holographic optical element (50) preferably forms a diffused viewing pupil for inspection of the light by the user.

4 Claims, 6 Drawing Figures

DIRECTIONAL DIFFUSING SCREEN WITH SUPPRESSED ZERO-ORDER LIGHT

TECHNICAL FIELD

The optical energy to a viewer is controlled across the viewing pupil by means of a diffraction optic viewing screen made by holographic optical element techniques. In order to prevent the light undiffracted by the holographic optical element from flooding the viewing pupil or flooding the ambient region, it is absorbed in an angularly oriented fiber optic faceplate in the diffusing screen system.

BACKGROUND OF THE INVENTION

Holographic optical elements can be fabricated in various ways to achieve various optical purposes. Work has been done on the use of holographic optical elements as viewing screens. For example, see the article by Dietrich Meyerhofer in Applied Optics, Vol. 12, No. 9, Sept. 9, 1973 at pages 2180 to 2184 entitled "Holographic and Interferometric Viewing Screens". Reference should also be made to American Journal of Physics 37:748 and Journal of the Optical Society of America 60:1635.

The performance of a display for viewing by an observer is limited by the brightness contrast, and resolution of the image as perceived by a person at the viewing pupil. With the conventional ground glass screen, the brightness of the image in a particular portion of the screen varies with the viewer's position. As perceived from the viewer's position at a particular point in the viewing pupil, such a screen is not at the same brightness over the whole area. The distribution of light is dependent upon the viewer's position within the viewing pupil. This type of distribution of light on the screen makes it difficult for the viewer to observe all parts of the viewing screen and reliably extract information therefrom. Therefore, in many cases a screen of uniform or distribution controlled brightness is desirable. Furthermore, it is desirable to be able to define a viewing pupil through which the majority of the light from the display screen is delivered.

Such control can be achieved by the use of a properly constructed holographic element, such as is disclosed in the patent application filed by Kenneth C. Johnson entitled "Directional Diffusing Screen" Ser. No. 270,159, Filed June 3, 1981, now U.S. Pat. No. 4,372,639, the entire disclosure of which is incorporated herein by this reference.

When the viewing pupil is in a direct line from the source, the light which passes through the holographic optical element without diffraction, called zero-order light, is also visible at the exit pupil so as to degrade the performance of the diffusing screen. Although theoretically the diffusing screen can diffract up to 100% of the incoming light, the practical devices and empirical results suggest that a substantial portion may not be diffracted and diffused by the holographic optical element. Therefore, the holographic optical element directional diffusing screen will always have a zero-order light problem, if no means is taken to alleviate that problem. In the above-identified Kenneth C. Johnson invention, the holographic optical element diffusing screen had its exit pupil positioned away from the zero-order light beam. Thus, the exit pupil did not have that unwanted direct illumination problem, but the zero-order light illuminates the space in which the viewer is located, to increase the ambient light level, which in many cases degrades the quality of the viewing.

SUMMARY OF THE INVENTION

In order to aid in the understanding of this invention it can be stated in essentially summary form that it is directed to a directional diffusing screen which employs a combination of a transmission hologram to direct the illumination away from the viewing pupil, a fiber optic faceplate for absorbing zero-order light undiffracted by the transmission hologram, and a diffraction holographic optical element diffusing screen which redirects the image light to the viewing pupil.

It is thus a purpose and advantage of this invention to provide diffraction optics system which suppresses the zero-order light to separate it from both the viewing pupil and the viewer's space to provide the desired intensity distribution over the viewing pupil and to reduce ambient lighting to enhance viewing. It is another purpose and advantage of this invention to provide holographic optical elements within a directional diffusing screen system whereby the exit pupil can be in line with the incoming light beam, and the zero-order light is absorbed in the system. It is a further advantage and purpose of this invention to provide a directional diffusing screen system which has a transmission hologram which redirects the image information at an angle to the incoming beam, a fiber optic faceplate positioned adjacent thereto to receive the image light and absorb the zero-order beam, and a diffraction optics diffusing screen positioned adjacent to the fiber optic faceplate to redirect the image light in the desired intensity across the viewing pupil with zero-order light from the diffraction optics diffusing screen either absorbed by total internal reflection in the support for the diffraction optics diffusing screen or directed to an ambient space which does not degrade the image quality.

Other purposes and advantages of this invention will become apparent from a study of the following portion of this specification, the claims and the attached drawings.

DETAILED DESCRIPTION OF THE INVENTION

Figure 1:
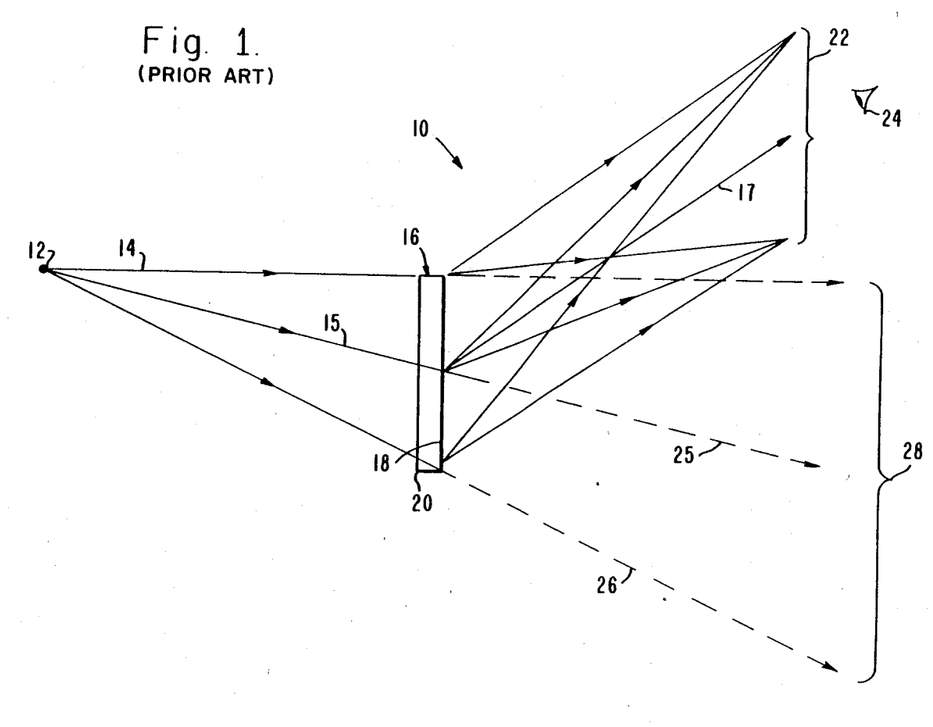
FIG. 1 is a schematic side elevational view of a directional diffusing screen and its associated principal optical paths.

FIG. 1 illustrates optical system 10 in which a point light source 12 projects a light beam 14 having center ray 15 through transmission holographic optical element 16. The source is preferably monochromatic or a narrow wavelength band, and it may encounter various optics, such as a collimating lens before element 16. The beam 14 usually carries information therein in the form of lateral or temporal modulation. Holographic optical element 16 is a holographic film 18, such as dichromated gelatin, mounted on a supporting substrate 20, such as optical glass. The manner of exposure and development of the holographic optical element 16 is described below. The holographic optical element 16 carries therein diffraction elements which cause diffraction of the beam 14 so that the beam is diffused and is spread across the viewing exit pupil 22 where it is seen by observer 24. Most of the light in beam 14 is diffused by holographic optical element 16 and directed into the exit pupil 22, see center ray 17. However a portion of the image light is undiffracted by holographic optical element 16 and passes straight through to become the undiffracted zero-order beam 26 with center ray 25 which is seen across the broad zero-order pupil 28. Such zero-order light degrades the performance of the diffusing screen by illuminating the area around pupil 22 to thus reduce contrast. Both empirical data and practical considerations suggest that less than 100% of the image light may be diffused by the holographic optical element 16 and seen at the pupil 22 so that a small but signifcant portion of the light will be in the zero-order beam and will be visible at the zero-order pupil 28, unless the zero-order light is otherwise accommodated.

A first preferred manner in which the holographic optical element 16 is exposed is described in detail in the above-identified Kenneth C. Johnson, patent application entitled "Directional Diffusing Screen". A holographic sensitive plate is exposed in the manner described in the Kenneth C. Johnson application to produce a latent image, and is then developed. A particular example of the plate is described in more detail in application for U.S. Pat. Ser. No. 137,343, filed Apr. 4, 1980 by I. J. Kurland and Andre Graube. In that disclosure, the chemical character of the plate, Its exposure and its development are described in detail. That disclosure is incorporated herein in its entirety by this reference. In order to provide suitable exposure, interfering wavefronts within the plate cause a latent image which can be developed to cause minute internal modulations of refractive index and/or extinction coefficient. A preferred method for the illumination of the holographic sensitive plates to provide the transmission and diffusion holographic optical elements employed in the present system is described with respect to FIGS. 5 and 6.

Figure 2:
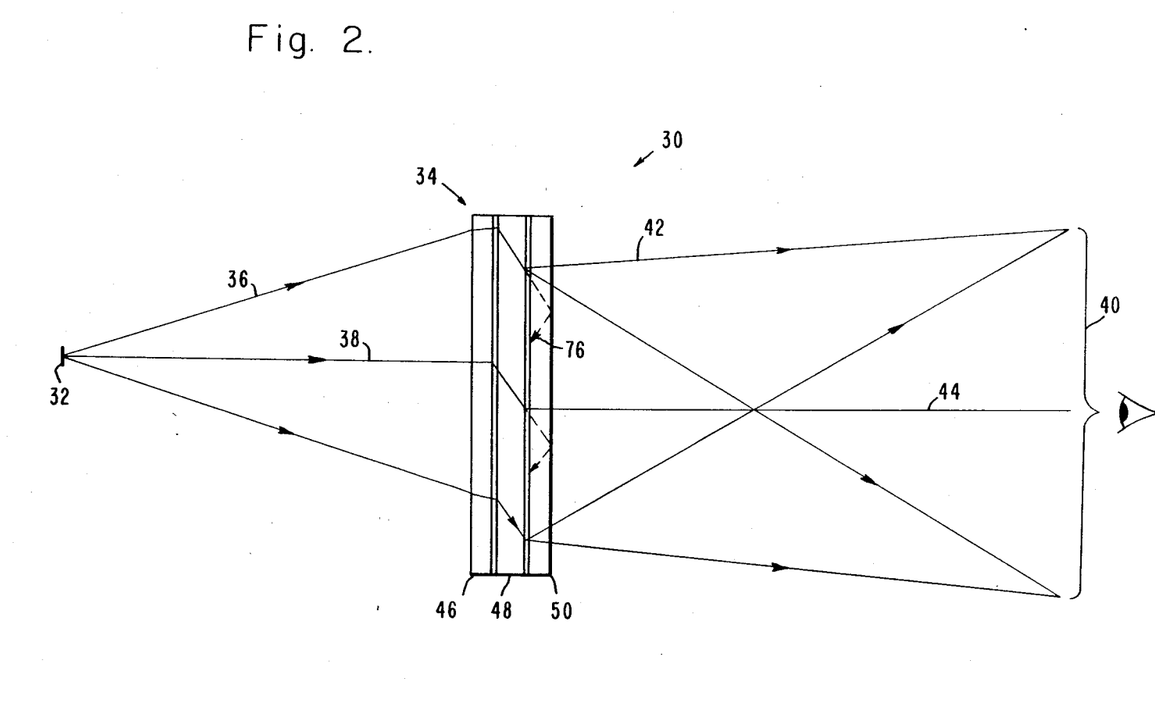
FIG. 2 is a schematic side elevational view of the directional diffusing screen with suppressed zero-order light in accordance with this invention.

FIG. 2 illustrates the directional diffusing screen system 30 with its feature of suppressed zero-order light, in accordance with this invention. Point source or near point source 32 illuminates system assembly 34 with light of beam 36, including center ray 38. The light is preferably monochromatic or narrow band. Beam 36 may encounter various optics before arriving at assembly 34. The beam 36 usually carries information in terms of the amount of brightness therein both laterally and temporally modulated. System assembly 34 treats the beam 36 so that it illuminates viewing pupil 40 in the desired way. Usually the viewing pupil 40 has uniform illumination thereacross, but the lateral illumination intensity can be selected as desired, as described in the Kenneth C. Johnson invention. Beam 42 with its center ray 44 is directed from the system assembly 34 to viewing pupil 40 without zero-order light, despite the fact that a substantial portion of the beam 36, with its center ray 38, is directed toward the viewing pupil 40.

Figure 3:
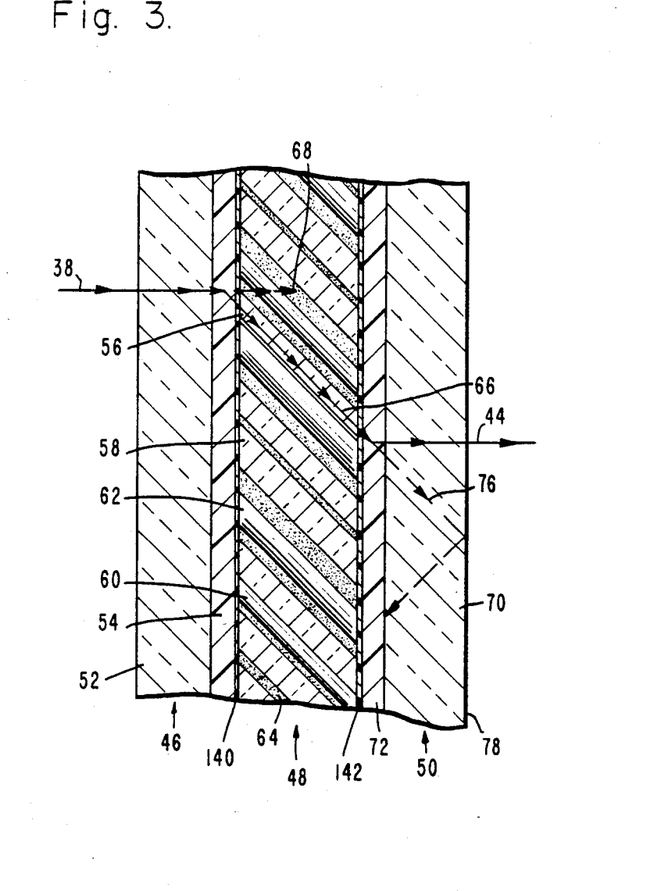
FIG. 3 is an enlarged detail of the directional diffusing screen system of this invention as illustrated in FIG. 2, shown in upright section.

As is seen in FIGS. 2 and 3, system assembly 34 is comprised of transmission holographic optical element 46, fiber optic faceplate 48 and diffusion holographic optical element 50. The details of the system assembly 34 are shown in FIG. 3. Transparent adhesive is necessary to join units 46, 48, and 50 into one optical assembly. The adhesive is usually index-matched to layers 46, 48, and 50, to prevent internal reflections between the various interfaces within structure 34. Assembly 34 comprises transmission holographic optical element 46 which has a transmissive support or substrate 52 carrying the holographic film 54 which contains the miniscule diffractive elements. Support 52 is a rigid transparent support such as one made of optical glass. A preferred manner of exposure of transmission holograhic optical element 56 will be described with respect to FIG. 5.

The center element of system assembly 34 is the fiber optic faceplate 48, see FIG. 3. Fiber optic faceplate 48 is a cross-sectional slab angularly cut from a bundle of many microscopically thin optical fibers which are adhesively secured to each other. As is seen in FIG. 3, the plurality of optical fibers, including optical fibers 56, 58, 60 and 62 are cemented together with cement 64. In actuality, these fibers are cemented together in a long bundle and a slab is angularly cut therefrom to form the fiber optic faceplate 48. When the light entering each fiber is at a small enough angle to the fiber center line, the light propagates through the fiber by repetitive total internal reflection off of the core-cladding interface, while light entering at too steep an angle partially passes through the interface causing the non-reflected ray to quickly die out. Assembly 34 is designed so that ray 66 is diffracted by element 46 into a direction parallel or nearly parallel to the axis of fiber 56.

The incoming center ray 38 is diffracted in transmission holographic optical element 46 through an angle of about 55° in this particular example. In general, any angle that directs the beam away from the viewing area can also be used. The fibers 56, 58, 60 and 62 are oriented at the same angle so as to receive the light which was diffracted, exemplified by center ray 66. The zero-order light which was undiffracted by holograhic optical element 46 is represented by ray 68 which is absorbed by the adhesive 64 between the optical fibers in the faceplate 48. Due to the high angle, ray 68 reflects very little within the fiber and most of it passes through the wall and into the absorbing adhesive. The small component of ray 68 that is reflected within the fiber dies out after a few internal multiple reflections.

Diffusion holographic optical element 50 is comprised of a support or substrate 70 which carries a holographic film layer 72 which contains the small diffractive elements which act upon the light. Support 70 is a transparent structure, such as optical glass. A preferred manner in which holographic film 72 is exposed to produce a developable latent image which can diffract the light is described with respect to FIG. 6. Transmission holographic optical element 46 and diffusion holographic optical element 50 are positioned on opposite sides of the fiber optic faceplate 48, in correct optical orientation, to form a single structural system assembly 34. The holographic optical element 50 has diffractive means in its gelatin layer 72 to diffract the center ray 66 in the direction to become center ray 44. Since the holographic optical element 50 is not 100% efficient, a small amount of the light in ray 66 is undiffracted to become a zero-order ray 76. The angle of the ray with respect to the outside surface 78 is greater than the critical angle of surface 78, so that the ray totally reflects within support 70 and is absorbed in the fiber optic faceplace cement. Thus, the undiffracted light does not pass into the ambient space. It is noted that the design and construction of assembly 34 need not be constrained to configurations where ray 76 is totally reflected within support structure 50. It may be advantageous to design structure 34 so that the angle of ray 66 is smaller than the critical angle, in which case a portion of ray 66 may exit structure 50 into an unimportant region of the ambient environment where ray 66 has no deleterious effects. The rays 38, 66 and 44, and their corresponding zero-order rays 68 and 76 represent a plurality of associated and related rays in the optical system. It is thus seen that the assembly 34 permits center ray 44 directed toward the viewing pupil 40 to be parallel to the incoming center ray 38, but the directional diffusing screen system assembly 34 prohibits the transmission of zero-order light into the viewing pupil. It is noted that, within certain limits, and with suitable optical construction, the center ray 44 may be at an angle with respect to the incoming center ray 38.

It is noted that incident beam 36 need not be monochromatic or narrowband. A broadband beam 36 incident on optical apparatus 34 will still cause narrowband diffuse light to enter well-defined exit pupil 40 as desired. Of the light incident in transmission holographic element 46, only that portion of light lying within a narrow spectral region will be diffracted substantially by element 46, in a direction parallel to the axis of optical fibers in faceplate 48. The undiffracted zero-order light will be absorbed by the faceplate. The narrowband light passing through fiber optic faceplate 48 and encountering transmission holographic element diffusing screen 50 will be diffracted by element 50 in a manner already described above.

Figure 4:
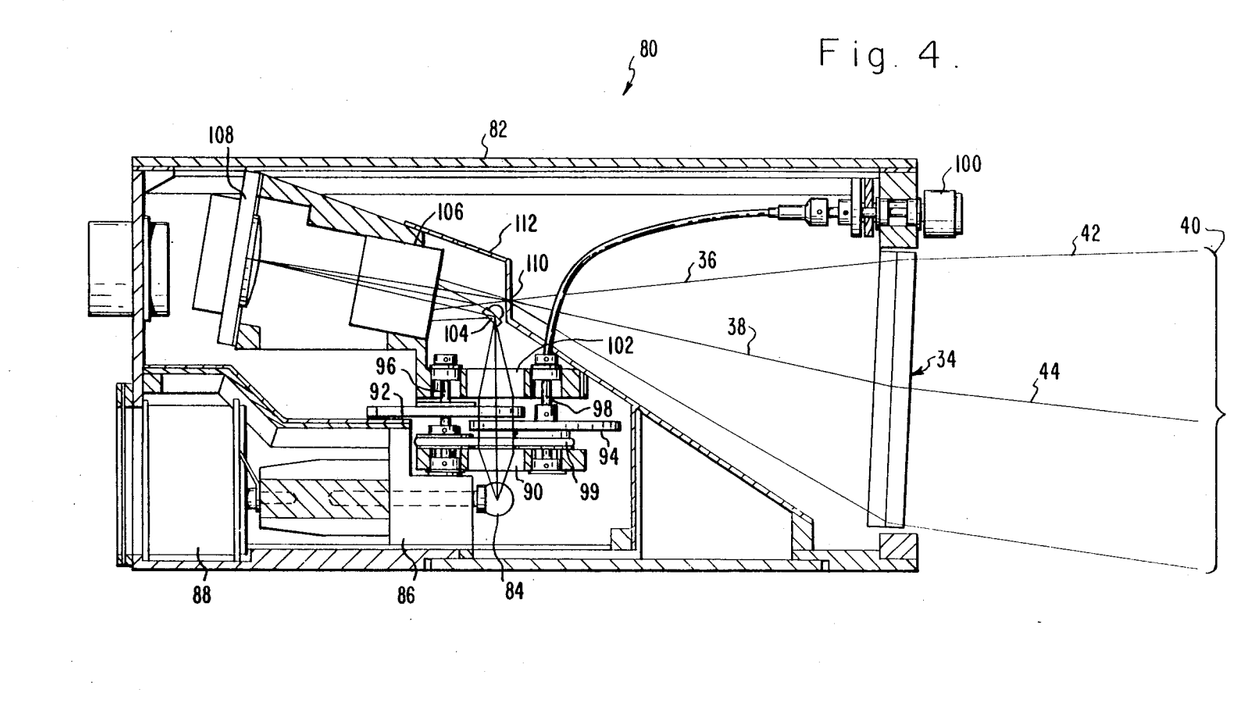
FIG. 4 is a longitudinal section through a display device incorporating the directional diffusing screen system of this invention.

FIG. 4 illustrates display 80 which incorporates the diffraction optics directional diffusing screen of this invention. Display 80 includes housing 82 which provides a structural support, protective enclosure and light constraining cover. Light source 84 is located within housing 82 and is mounted upon base 86. Fan 88 blows cooling air over the lamp and its base. The light output from lamp 84 is reflected upward and is focused by condensor lens 90. A pair of circular tapered neutral grey filter discs 92 and 94 is positioned in the upward optical path. Filters 92 and 94 are respectively mounted on shafts 96 and 98 so that they can rotate different density areas into the light path. The two shafts are coupled together by means of belt 99 so that the filter discs rotate together. In view of the fact they are both tapered and complementary and rotate in opposite directions, the filter density is uniform over the entire optical area. Rotation of the discs changes the total density of the pair of filter discs. Control knob 100 permits external adjustment of the control. Lenses in lens housing 102 focus the point source of light 84 on mirror 104, which reflects the beam through a set of lenses in lens housing 106, and delivers the illumination to liquid crystal display 108.

The liquid crystal display is such that the reflection therefrom may either be specular or diffuse depending upon the energization thereof. Information is provided to the liquid crystal display by way of selective electrical energization. In this way information is imparted to the light beam. The image on liquid crystal display 108 is focused by the lenses in housing 106 through pinhole 110 adjacent to mirror 104. Pinhole 110 is in wall 112 which completely separates housing 82 into two zones. Below and to the left of wall 112 is the light source, most of the lenses and the liquid crystal display which has some diffuse output. The small size of the pinhole 110 permits transmission of the specularly reflected information and very little of the diffuse illumination. Thus, substantially only the information-containing specularly-reflected light is projected through the pinhole 110. To the right of wall 112 substantially only the image light and not the diffuse light is found. The beam 36 with its center ray 38 from pinhole 110 is the near-point source of light 32 described with respect to FIG. 2. The system assembly 34 is positioned in the right end of housing 82 and directs the light containing the information into the viewing pupil 40 also illustrated in FIG. 4.

Figure 5:
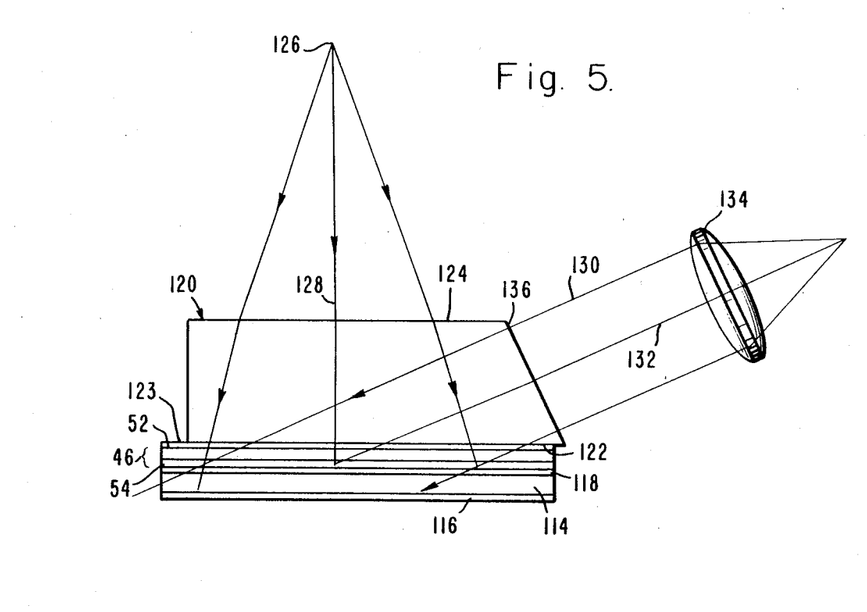
FIG. 5 is a schematic side elevational optical diagram showing the construction optics for the transmission hologram included in the directional diffusing screen system of this invention.
Figure 6:
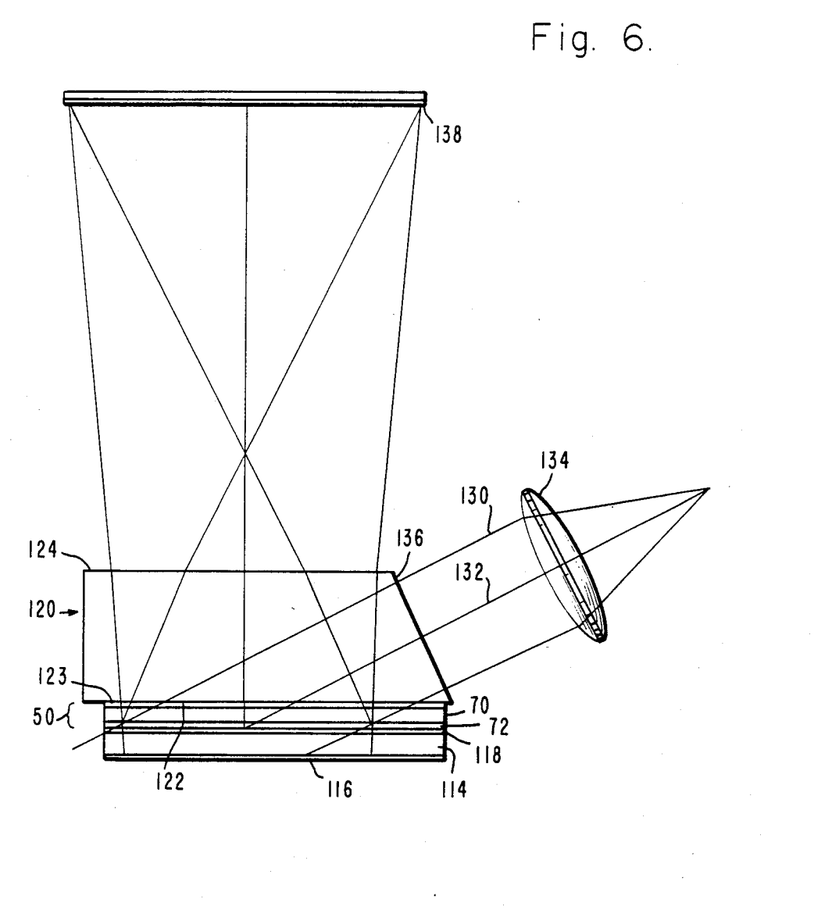
FIG. 6 is a schematic side elevational optical diagram showing the construction optics for the holographic optical element directional diffusing screen used in the directional diffusing screen system of this invention.

A first preferred method for fabricating elements 46 and 50 in FIG. 3 is illustrated in FIGS. 5 and 6. FIG. 5 shows the optical apparatus for exposing a latent image into the sensitive gelatin structure which, after development, will become the transmission holographic optical element 46. The support 52 with its gelatin 54, which will become the transmission holograhic optical element 46, are placed on cover plate 114 which carries anti-reflective backing 116. Index matching oil 118 is placed between to temporarily join the structure as an optical assembly.

Block 120 has a lower face 122 lying against support 52. Index matching oil 123 is placed between to temporarily join the structure as an optical assembly. Block 120 has an upper face 124 which is preferably parallel to the lower face so that a reference beam from point source 126 can pass through block 120 to the holographic film layer 54. The center ray 128 is illustrated. Collimated object beam 130 with its center ray 132 is supplied by collimating lens 134. Both sources are preferably from the same laser so that the wavefronts in the two beams are coordinated. Block 120 is an angular face 136 which is preferably normal to center ray 132. The face 136 permits the light at the lower angle of object beam 130 to pass through support 52 into gelatin 54. If block 120 were absent, the beam 130 would be at too steep of an angle to enter structure 46. The two beams interact in the holographic film to form a latent image which can be developed. It should be noted that this structure is a corollary to the optical result desired in transmission holographic optical element 46, as described in FIG. 3. After exposure, the holographic optical element is developed.

FIG. 6 schematically shows the optical system for exposure of the holographic film which will become the holographic optical element 50. Support 70 and its film 72 are placed upon cover plate 114 with its anti-reflective backing 116. The backing 116 can be an adhesively attached anti-reflective black layer. Index matching fluid 118 is provided. Glass block 120 has its lower face 122 against support 70. Index-matching fluid 123 is provided. Upper face 124 is exposed from diffusing screen 138 which is illuminated from above by means of a laser. Diffusing screen 138 is usually of uniform illumination so that the viewing pupil 40 will be uniformly illuminated. However, if other arrangements of illumination intensity are desired at pupil 40, they are accomplished by creating that arrangement of illumination intensity on diffusing screen 138. Collimated reference beam 130 is supplied by the same laser through collimating lens 134. Center ray 132 of the reference beam is illustrated. The reference beam passes through angular face 136 of block 120.

The interaction between the two beams causes the production of a latent image in the gelatin. The gelatin is thereupon developed as described above to form the diffraction holographic optical element. By this means, the gelatin 76 is exposed and when the latent image is developed, the diffusion holographic optical element 50 is created. The three optical elements 46, 48 and 50 are attached together by glue layers 140 and 142 of index matched material and the assembly 34 is thus produced.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An optical apparatus comprising:
   a first holographic optical element possessing diffractive means therein for diffracting a portion of a beam of light incident on said first holographic optical element to redirect said diffracted light so that it exits from said first holographic optical element at acute angles relative to the corresponding portions of the incident beam;
   a fiber optic faceplate adjacent the first holographic optical element having light absorbing material and a plurality of substantially parallel optical firbers therein, said fibers positioned so that said diffracted light propagates therethrough and undiffracted light from said incident beam passes through said fibers and is absorbed in said light absorbing material; and
   a second holographic optical element, carried on a transparent support, and positioned adjacent said fiber optic faceplate, said second holographic optical element having diffractive means therein by means of which light exiting said fiber optic faceplate and incident thereon is diffusively diffracted toward a predetermined exit pupil so that light diffracted by said second holographic optical element is substantially directed toward and illuminates said exit pupil with a selected intensity distribution.

2. The optical apparatus of claim 1 wherein said transparent support for said second holographic optical element is configured so that light diffracted by said second holographic optical element is incident at less than the critical angle with respect to said support so that said light diffracted by said second holographic optical element passes through to illuminate said exit pupil and light which passes from said fiber optic faceplate and is incident upon said second holographic optical element but is not diffraced thereby enters into said support at an angle such that said undiffracted light reflects in said support.

3. The optical apparatus of claim 1 further including in combination:
   an information carrying screen; and
   means for projecting light carrying information from said screen onto said first holographic optical element so that light carrying information is diffracted by said first holographic optical element, passes through said fiber optic faceplate and is diffracted by said second holographic optical element toward said viewing pupil.

4. An optical apparatus comprising:
   an information-carrying screen;
   a light source for illuminating said information carrying screen;
   means for projecting light carrying information from said screen;
   an optical assembly positioned so that said projected light is incident thereon, said optical assembly comprising:
   a first holographic optical element having diffraction means therein for diffracting a portion of said light in a predetermined angle to exit out of an exit side of said first holographic optical element;
   a fiber optic faceplate having light absorbing material and a plurality of substantially parallel optical fibers positioned therein, said faceplate positioned adjacent to the exit side of said first holographic optical element so that the diffracted light exiting from said first holographic optical element propagates through said optical fibers and light undiffracted by said first holographic optical element passes through said fibers and is absorbed in said light absorbing material; and
   a second holographic optical element, carried upon a substantially transparent support, said second holographic optical element receiving information carrying light from said fiber optic faceplate and diffusely diffracting a portion thereof to form a diffused image at a viewing aperture with a selected intensity distribution across said viewing aperture, said support being configured so that light passing from said fiber optic faceplate, which is undiffracted by said second holographic optical element, is internally reflected in said support.

* * * * *